Nov. 25, 1952  R. W. ESAREY  2,619,391
ELECTRIC MOTOR SHAFT AND BEARING CONSTRUCTION
Filed May 15, 1950
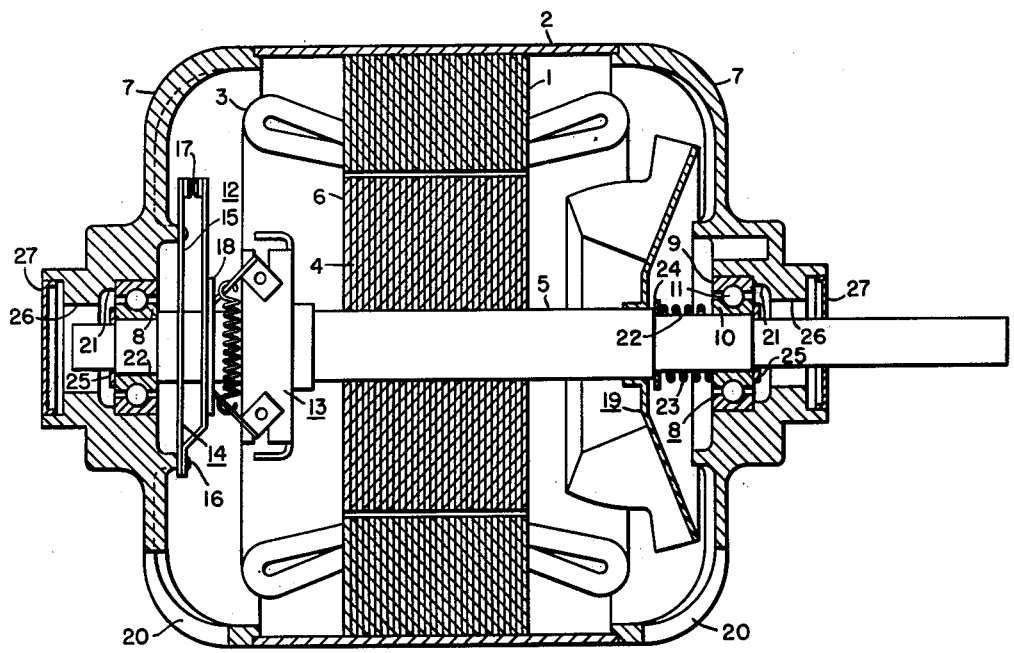
WITNESSES:
Edward Michaels
Wm. C. Groome
INVENTOR
Raymond W. Esarey.
BY
ATTORNEY Patented Nov. 25, 1952

2,619,391

UNITED STATES PATENT OFFICE 2,619,391

ELECTRIC MOTOR SHAFT AND BEARING CONSTRUCTION

Raymond W. Esarey, Lima, Ohio, assignor to Westinghouse Electric Corporation, East Pittsburgh, Pa., a corporation of Pennsylvania Application May 15, 1950, Serial No. 162,046

8 Claims. (Cl. 308—178)

The present invention relates to the construction of dynamo-electric machines, and more particularly to a low-cost construction for electric motors.

The principal object of the invention is to provide a construction for electric motors, which is especially suitable for motors of the smaller sizes, such as fractional horsepower motors, and which is of low cost and facilitates assembly of the motor.

Another object of the invention is to provide an electric motor having anti-friction bearings and utilizing end brackets of a metal, such as aluminum or an aluminum alloy, which can be formed by die-casting and which are much lower in cost than conventional cast-iron end brackets.

A further object of the invention is to provide an electric motor having anti-friction bearings and die-cast end brackets, in which the outer races of the bearings are pressed directly into the end brackets, without the use of steel inserts, thus providing a very low-cost construction, and in which the shaft has a close sliding fit in the inner races of the bearings and is provided with means for locking the shaft to the bearings after assembly is completed. In this way the bearings are carried by the end brackets rather than by the shaft, as in the conventional construction, and assembly of the motor is greatly facilitated, further reducing the cost.

Other objects and advantages of the invention will be apparent from the following detailed description, taken in connection with the accompanying drawing, the single figure of which is a longitudinal sectional view of an electric motor embodying the invention.

The particular motor shown in the drawing for the purpose of illustration is a single-phase induction motor of the split-phase type, although it is to be understood that the invention is not limited to any particular type or size of motor, but is generally applicable to dynamo-electric machines of any kind.

The motor shown in the drawing has a laminated stator core 1 supported in a cylindrical frame 2 of steel, or other suitable material. The stator core 1 carries suitable primary windings 3 which in the particular motor shown include a main winding and an auxiliary or starting winding. The motor also has a rotor member including a laminated rotor core 4 mounted on a shaft 5 and carrying a squirrel-cage secondary winding 6. End brackets 7 are provided at each end of the stator and may be secured to the frame 2 in any suitable or usual manner, as by through bolts. Both end brackets 7 may be of identical construction, and in order to reduce the cost they are made of a metal such as aluminum, or an aluminum alloy, which can be formed by die-casting. The use of die-cast end brackets effects a substantial saving over the cost of the conventional cast-iron brackets since the expensive sand casting operation is avoided and a considerable amount of machining is eliminated. The shaft 5 is supported in the end brackets 7 by means of anti-friction bearings 8, shown as ball bearings having outer races 9 and inner races 10 with a row of balls 11 between them.

A speed-responsive starting switch 12 is provided within one of the end brackets 7 to control the auxiliary primary winding of the motor to disconnect it from the line when the motor has accelerated to a predetermined speed. The switch 12 may be of any suitable type and is shown as having a rotating member 13 mounted on the shaft 5 and a stationary member 14 mounted on the inside of the adjacent end bracket 7. The stationary member 14 of the switch includes a mounting plate 15 which is secured to the end bracket 7 by screws 16, or in any other suitable manner, and which carries the contacts 17 of the switch. The contacts 17 are normally held in closed positioned by the slider 18 of the rotating member 13, but when the motor has reached a predetermined speed, the slider 18 is moved away from the stationary member, allowing the contacts 17 to open. This is a more or less usual type of speed-responsive switch and is shown for the purpose of illustration only, since any type of speed-responsive switch may be used, or the switch may be omitted if the invention is applied to a motor of a type which does not require such a switch. If desired, a ventilating fan 19 may be mounted on the shaft 5 to force ventilating air through the motor, the air entering and leaving through ventilating openings 20 in the end brackets 7.

In the usual construction of ball bearing motors, the inner races of the bearings are pressed or otherwise rigidly secured on the shaft, so that the bearings are carried by the shaft, and in assembling the motor, the outer races of the bearings are inserted in recesses in the end brackets and held therein by means of bearing caps or screws, or other suitable securing means. If this type of construction is used with end brackets of relatively soft metal such as aluminum, which is suitable for die-casting, however, it is impossible to insert the hardened steel bearing races into recesses in the soft metal brackets, and to withdraw them from the brackets if removal of the brackets from the motor becomes necessary, without damaging the brackets, or the bearings, or both. For this reason, it is necessary to provide steel inserts in the bearing recesses to permit assembly and disassembly of the motor without damaging the brackets, if the conventional construction of ball bearing motors is used with die-cast end brackets. The steel inserts are also necessary to prevent damage due to wear caused by rotation of the bearing relative to the bracket. The use of such inserts of course, materially increases the cost, and at least partially nullifies the otherwise substantial cost advantage of die-cast brackets over the conventional cast-iron brackets.

In accordance with the present invention, the outer races 9 of the bearings 8 are pressed directly into central recesses 21 in the die-cast end brackets, and no steel inserts are used. The bearings 8 are thus immovably, and more or less permanently, secured in the end brackets 7 and are carried by the brackets, rather than by the shaft. The shaft 5 has its journal portions 22 accurately ground to size to have a close sliding fit in the inner races 10 of the bearings, so that the shaft can be inserted into the bearings and fits closely in them. A helical compression spring 23 is placed over one end of the shaft inside the bearing at that end, and a washer 24 is placed on the shaft bearing against a shoulder on the shaft to provide an abutment for the spring 23, which is compressed between the washer 24 and the inner race 10 of the adjacent bearing, thus applying an axial force to the shaft 5. The shaft has a shoulder engaging the inner race of the bearing at the opposite end, and the spring 23 holds the shaft in the bearings against axial movement and takes up any variations in spacing that may exist due to manufacturing variations in the dimensions of the frame 2 or the end brackets 7, so that no looseness or end play will exist due to the sliding fit of the shaft in the bearings. After assembly of the motor is completed, and, if desired, after the motor has been tested, the inner races 10 of the bearings are locked to the shaft 5 by means of spring rings 25 placed on the shaft on the outside of the bearings. The spring rings 25 tightly engage the shaft and bear against the inner races of the bearings, thus gripping the race of the left-hand bearing between the spring ring and the shaft shoulder and gripping the race of the right-hand bearing between the spring ring and the spring 23, so as to lock the inner races to the shaft to rotate with it. The ends of the shaft are accessible through central openings 26 of the end brackets, so that the rings 25 can readily be put in place after assembly, and the bracket openings 26 are closed by cap members 27, one of which has an opening to permit passage of the shaft through it.

It will be seen that this new motor construction makes possible a substantial reduction in cost, as compared to conventional motor constructions, because it makes it possible to utilize die-cast end brackets without requiring steel inserts for the bearings, since the bearings are pressed directly into the brackets and are not intended to be removed from them, so that the motor can be assembled and disassembled without damaging the relatively soft metal brackets. The new construction has a further advantage in facilitating assembly of the motor. The mounting plate 15 of the stationary member of the switch 12 is secured to the inside of one of the end brackets and has a central opening through which the shaft 5 passes. The size of the bearing 8, however, is such that in the conventional construction of ball bearing motors, in which the bearing is secured to the shaft, the bearing will not pass through the central opening of the mounting plate 15. In assembling such a motor, therefore, the mounting plate must be placed on the shaft before the bearing is pressed on the shaft, and the plate 15 must be mounted on the inside of the bracket after the bracket has been assembled on the frame and the shaft inserted. This is obviously a very difficult assembly operation and substantially increases the labor cost involved in the manufacture of such a motor. In the construction of the present invention, however, since the bearings are secured in the end brackets rather than on the shaft, the mounting plate 15 can be secured to the bracket 7 before it is assembled on the motor, greatly facilitating the assembly of the motor.

It should now be apparent that a construction has been provided for ball bearing electric motors which makes possible a substantial cost reduction by the use of low-cost die-cast brackets and by substantially facilitating assembly of the motor. A preferred embodiment of the invention has been shown and described for the purpose of illustration, but it will be apparent that the invention is applicable to motors of other types and that various changes and modifications may be made within the scope of the invention. It is to be understood, therefore, that the invention is not limited to the specific details of construction shown, but in its broadest aspects, it includes all equivalent embodiments and modifications which come within the scope of the appended claims.

I claim as my invention:

1. A dynamo-electric machine having a stator member and a rotor member, said rotor member including a shaft, end brackets at the ends of the stator member, anti-friction bearings secured in said end brackets, said shaft having a close sliding fit in the bearings, resilient means for applying axial pressure between the shaft and the bearings, and means for locking the bearings to the shaft.

2. A dynamo-electric machine having a stator member and a rotor member, said rotor member including a shaft, an end bracket at each end of the stator member, anti-friction bearings having inner and outer races, the outer race of each bearing being immovably secured in one of the end brackets, said shaft having a close sliding fit in the inner races of the bearings, resilient means for applying axial pressure between the shaft and the bearings, and means for locking the inner races to the shaft.

3. A dynamo-electric machine having a stator member and a rotor member, said rotor member including a shaft, an end bracket at each end of the stator member, anti-friction bearings having inner and outer races, the outer race of each bearing being immovably secured in one of the end brackets, said shaft having a close sliding fit in the inner races of the bearings, a compression spring disposed on the shaft adjacent one of the bearings, abutment means on the shaft, one end of said spring engaging the abutment means and the other end of the spring engaging the inner race of the adjacent bearing, and means for locking the inner races to the shaft.

4. A dynamo-electric machine having a stator member and a rotor member, said rotor member including a shaft, an end bracket at each end of the stator member, each end bracket having a central bearing recess therein, anti-friction bearings having inner and outer races, the outer race of each bearing fitting tightly in the bearing recess of one of the end brackets to be secured immovably therein by frictional engagement, said shaft having a close sliding fit in the inner races of the bearings, means for applying axial pressure between the shaft and the bearings, and means for locking the inner races to the shaft.

5. A dynamo-electric machine having a stator member and a rotor member, said rotor member including a shaft, an end bracket at each end of the stator member, each end bracket having a central bearing recess therein, anti-friction bearings having inner and outer races, the outer race of each bearing fitting tightly in the bearing recess of one of the end brackets to be secured immovably therein by frictional engagement, said shaft having a close sliding fit in the inner races of the bearings, a compression spring disposed on the shaft adjacent one of the bearings, abutment means on the shaft, one end of said spring engaging the abutment means and the other end of the spring engaging the inner race of the adjacent bearing, and means for locking the inner races to the shaft.

6. A dynamo-electric machine having a stator member and a rotor member, said rotor member including a shaft, an end bracket at each end of the stator member, said end brackets being made of a relatively soft metal which is capable of being formed by die-casting, each end bracket having a central bearing recess therein, anti-friction bearings having inner and outer races, the outer race of each bearing fitting tightly in the bearing recess of one of the end brackets to be secured immovably therein by frictional engagement, said shaft having a close sliding fit in the inner races of the bearings, and means for locking the inner races to the shaft.

7. A dynamo-electric machine having a stator member and a rotor member, said rotor member including a shaft, an end bracket at each end of the stator member, said end brackets being made of a relatively soft metal which is capable of being formed by die-casting, each end bracket having a central bearing recess therein, anti-friction bearings having inner and outer races, the outer race of each bearing fitting tightly in the bearing recess of one of the end brackets to be secured immovably therein by frictional engagement, said shaft having a close sliding fit in the inner races of the bearings, resilient means for applying axial pressure between the shaft and the bearings, and means for locking the inner races to the shaft.

8. A dynamo-electric machine having a stator member and a rotor member, said rotor member including a shaft, an end bracket at each end of the stator member, said end brackets being made of a relatively soft metal which is capable of being formed by die-casting, each end bracket having a central bearing recess therein, anti-friction bearings having inner and outer races, the outer race of each bearing fitting tightly in the bearing recess of one of the end brackets to be secured immovably therein by frictional engagement, said shaft having a close sliding fit in the inner races of the bearings, a compression spring disposed on the shaft adjacent one of the bearings, abutment means on the shaft, one end of said spring engaging the abutment means and the other end of the spring engaging the inner race of the adjacent bearing, and means for locking the inner races to the shaft.

RAYMOND W. ESAREY.

REFERENCES CITED

The following references are of record in the file of this patent:

UNITED STATES PATENTS

| Number | Name | Date |
|---|---|---|
| 1,157,945 | Levin | Oct. 26, 1915 |
| 1,755,054 | Darst | Apr. 15, 1930 |
| 2,217,656 | Boehme | Oct. 15, 1940 |